(12) United States Patent
Segroves

(10) Patent No.: US 8,051,881 B2
(45) Date of Patent: Nov. 8, 2011

(54) METAL RETAINED TENSION TIE TOOL

(75) Inventor: Roger D Segroves, Lockport, IL (US)

(73) Assignee: Panduit Corp., Tinley Park, IL (US)

( * ) Notice: Subject to any disclaimer, the term of this patent is extended or adjusted under 35 U.S.C. 154(b) by 844 days.

(21) Appl. No.: 12/060,565

(22) Filed: Apr. 1, 2008

(65) Prior Publication Data

US 2009/0242069 A1    Oct. 1, 2009

(51) Int. Cl.
*B21F 99/00* (2009.01)
(52) U.S. Cl. ............ 140/123.6; 53/399; 100/32; 100/29
(58) Field of Classification Search ................ 140/93.2, 140/93.4, 93 A, 150, 123.5, 123.6; 53/399, 53/582, 589; 100/32, 29, 33 PB
See application file for complete search history.

(56) References Cited

U.S. PATENT DOCUMENTS

| | | |
|---|---|---|
| 4,534,817 A | 8/1985 | O'Sullivan |
| 4,934,416 A | 6/1990 | Tonkiss |
| 5,154,210 A | 10/1992 | Scruggs |
| 5,257,535 A * | 11/1993 | Evans .............................. 73/168 |
| 5,368,278 A * | 11/1994 | Kurmis ......................... 254/216 |
| 5,368,279 A | 11/1994 | Ottemann et al. |
| 5,483,998 A * | 1/1996 | Marelin et al. ................ 140/93.4 |
| 5,595,220 A | 1/1997 | Leban et al. |
| 5,845,681 A | 12/1998 | Kurmis |
| 5,909,751 A | 6/1999 | Teagno |
| 5,934,341 A | 8/1999 | Thieme |
| 6,039,089 A | 3/2000 | Kurmis |
| 6,109,325 A | 8/2000 | Chang |
| 6,202,706 B1 | 3/2001 | Leban |
| 6,279,620 B1 | 8/2001 | Eason et al. |
| 6,302,157 B1 | 10/2001 | Deschenes et al. |
| 6,481,467 B2 * | 11/2002 | Czebatul et al. ............. 140/93.2 |
| 6,497,258 B1 | 12/2002 | Flannery et al. |
| 6,698,460 B2 | 3/2004 | Marsche |
| 6,981,528 B2 | 1/2006 | Bartholomew |
| 2002/0129866 A1 | 9/2002 | Czebatul et al. |
| 2005/0166990 A1 | 8/2005 | Stillings et al. |

FOREIGN PATENT DOCUMENTS

GB          640345 A      7/1950

\* cited by examiner

*Primary Examiner* — Dana Ross
*Assistant Examiner* — Matthew G Katcoff
(74) *Attorney, Agent, or Firm* — Robert A. McCann; Christopher S. Clancy; Aimee E. McVady

(57) ABSTRACT

A tool that installs a metal tie is disclosed. The tool includes a tension mechanism and a tension control system. The tension mechanism tensions the metal tie wrapped around a bundle. The tension control system measures the applied tie tension. The tension control system includes a load cell and a worm cushion that dampens the tension applied to the load cell. The tension mechanism includes a gear train with a worm gear and a worm that distribute the applied tension to the load cell. Once the desired tension has been achieved, the tension mechanism is de-energized and a ball set and cut-off mechanism is activated to set the ball in the metal tie head and to shear a portion of the tensioned metal tie.

9 Claims, 16 Drawing Sheets

METAL RETAINED TENSION TIE TOOL

FIELD OF THE INVENTION

The present invention relates to a metal tie tool, and more particularly to a metal retained tension tie tool with an electric tension control system.

BACKGROUND OF THE INVENTION

As is well known to those skilled in the art, cable ties, or straps are used to bundle or secure a group of articles such as electrical wires and cables. Cable ties of conventional construction include a cable tie head and an elongated tail extending therefrom. The tail is wrapped around a bundle of articles and thereafter inserted through the passage in the head. The head of the cable tie typically supports a locking element, which extends into the head passage and engages the body of the tail to secure the tail to the head.

In practice, the installer manually places the tie about the articles to be bundled and inserts the tail through the head passage. At this point, a cable tie installation tool is used to tension the tie to a predetermined tension. The tools of the prior art, although capable of tensioning and thereafter severing the excess portion of the cable tie, typically have several disadvantages therewith. As a result, it is desirable to provide a metal tie tool having an improved electric tension control system. It is also desirable to provide a metal tie tool having an improved ball set and cut-off mechanism.

SUMMARY OF THE INVENTION

A tool that installs a metal tie is disclosed. The tool includes a tension mechanism that tensions a metal tie around a bundle and a tension control system that measures the applied tie tension. The tension control system includes a load cell and a worm cushion that dampens the tension applied to the load cell. The tension mechanism includes a gear train with a worm gear and a worm that distribute the applied tension to the load cell and rotary gripper gears that tension the metal tie. Once the load cell measures the desired applied tie tension, the tension mechanism is de-energized and a ball set and cut-off mechanism is activated to set the ball in the metal tie head and to shear a portion of the tensioned metal tie.

DETAILED DESCRIPTION

Figure 1:
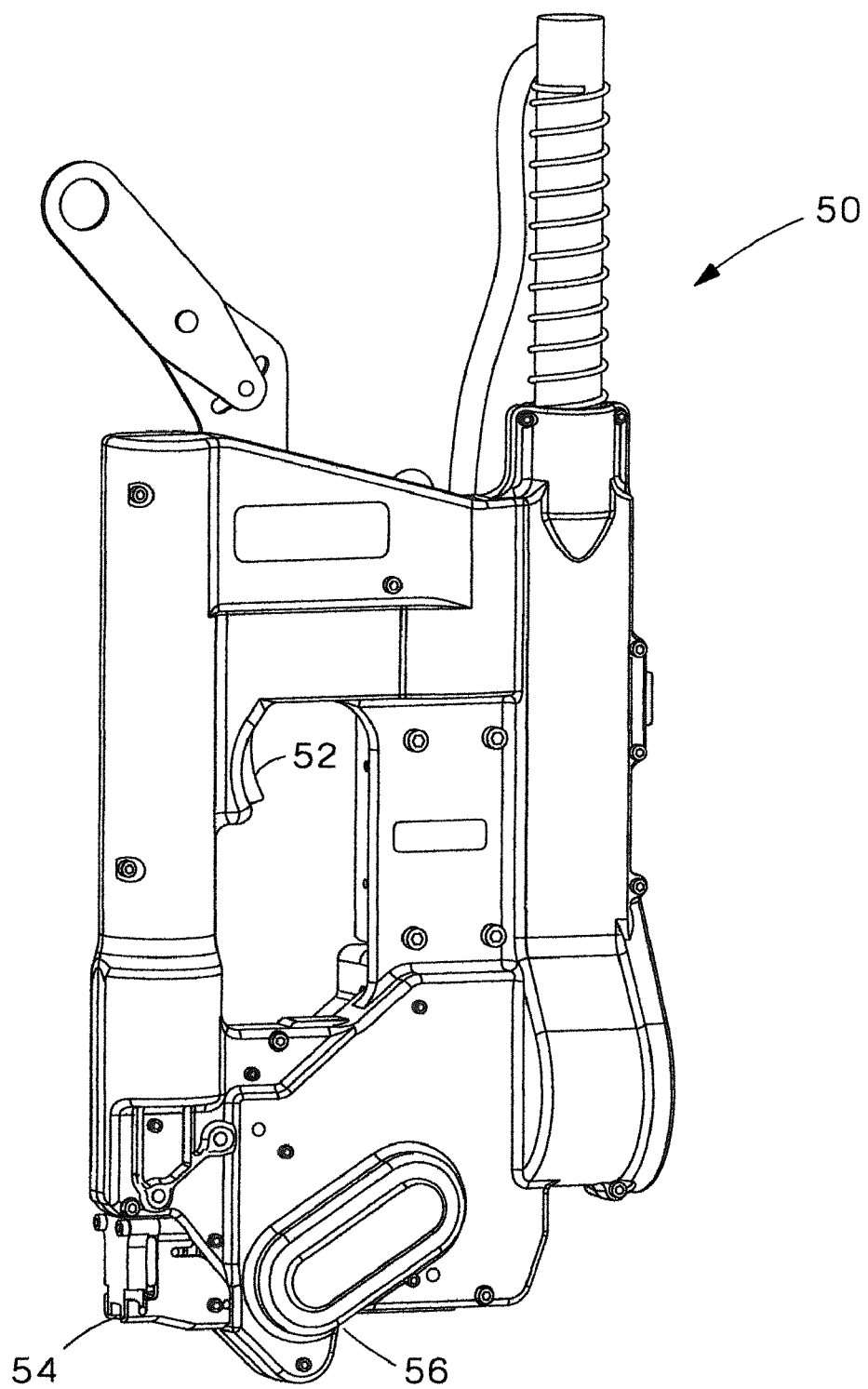
FIG. 1 is a right side perspective view of the metal retained tension tie tool of the present invention.
Figure 2:
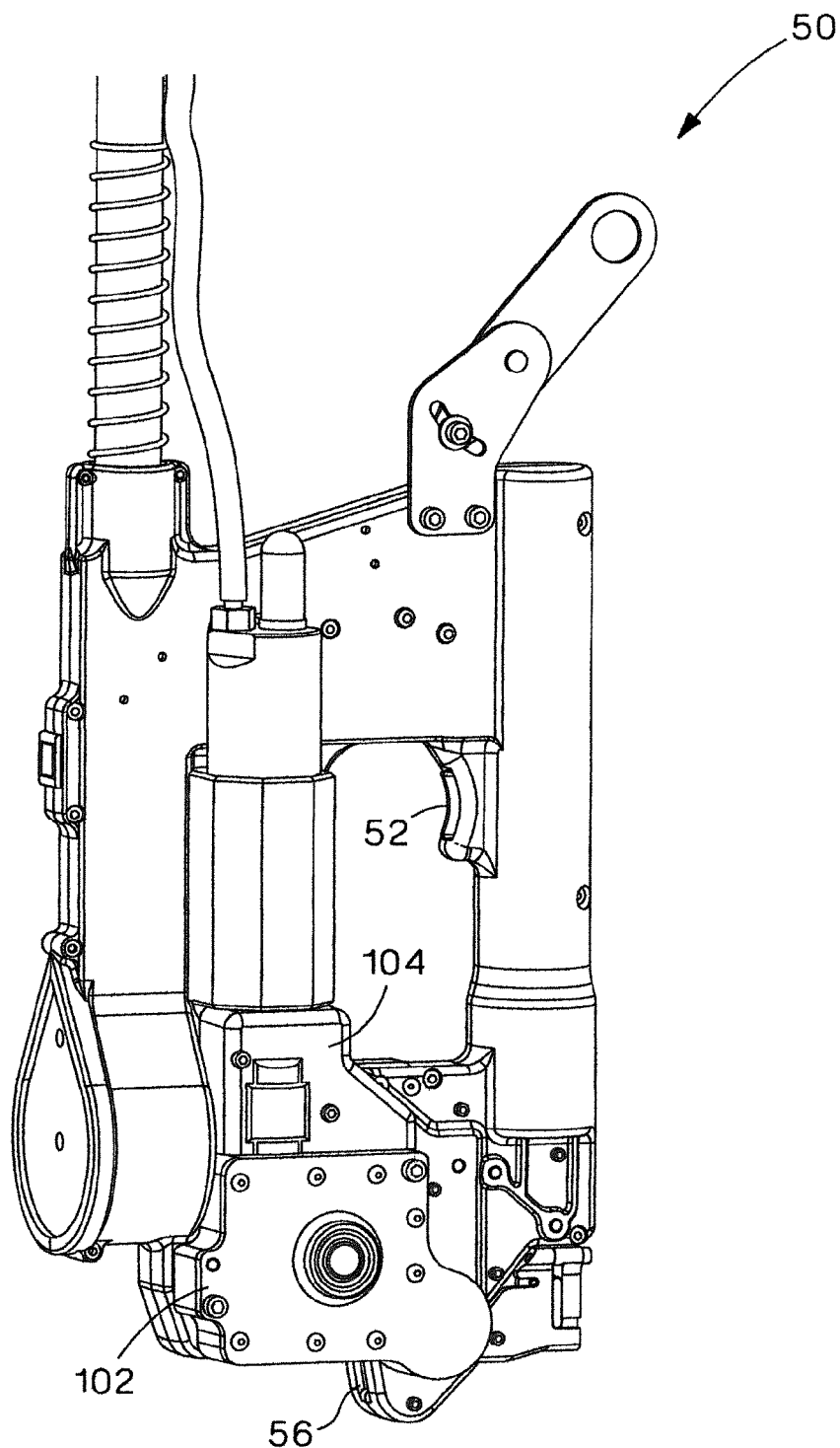
FIG. 2 is a left side perspective view of the metal retained tension tie tool of FIG. 1.

FIGS. 1 and 2 illustrate a right and left side view, respectively, of the metal retained tension tie tool 50 of the present invention. The metal retained tension tie tool 50 includes rotary gripper gears 70 (see FIGS. 3-7) for tensioning the metal tie 200, an electric tension control system 100 (see FIGS. 8-12) and a ball set and tie shear mechanism 150 (see FIGS. 3, 4 and 13-16). The metal retained tension tie tool 50 includes a tie entry 54 and a tie tail exit 56 for releasing the sheared tie tail 202.

FIGS. 3-7 illustrate the rotary gripper gears 70 that tension the metal tie 200. The rotary gripper gears 70 includes a pancake cylinder 72, gripper gear toggle links 74, a gear train 76, a large gripper gear 90 and an idle gripper gear 92. A tension motor 58 (see FIG. 8) generates the rotary motion of the gears. The rotary motion is controlled by the gear train 76 that reduces the speed to achieve the torque needed to pull the tie 200. As discussed below, when the gear toggle links 74 are engaged and the gears rotate, the large gripper gear 90 and the idle gripper gear 92 mesh together to create the pulling force on the tie tail 202.

Figure 9:
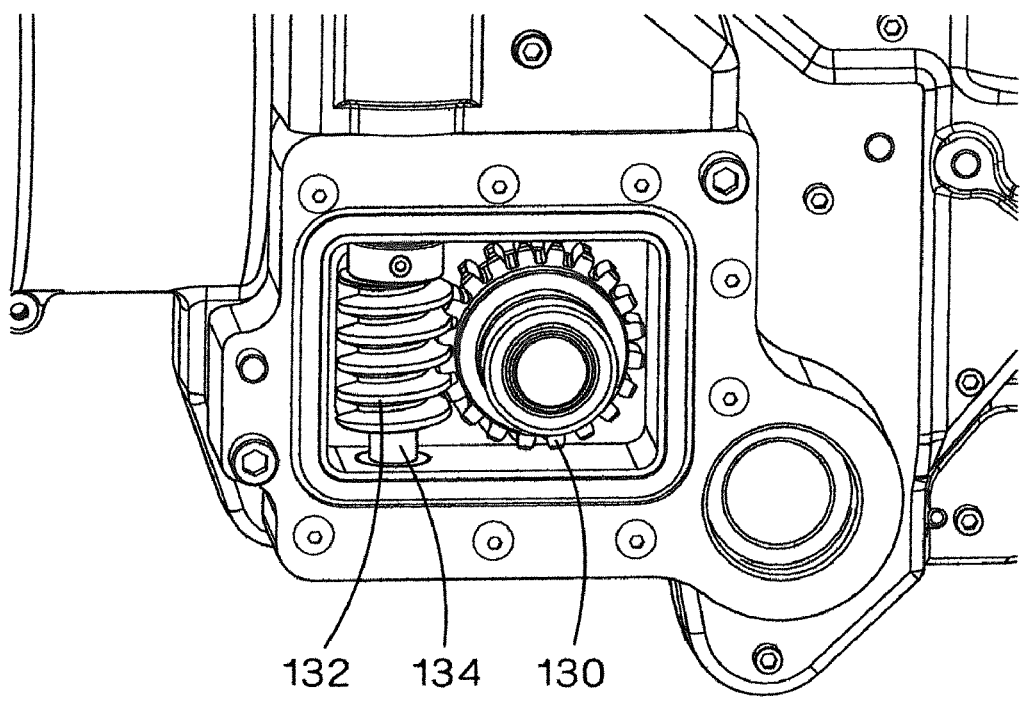
FIG. 9 is a partial side view of the metal retained tension tie tool of FIG. 2 with the gear box cover removed.
Figure 10:
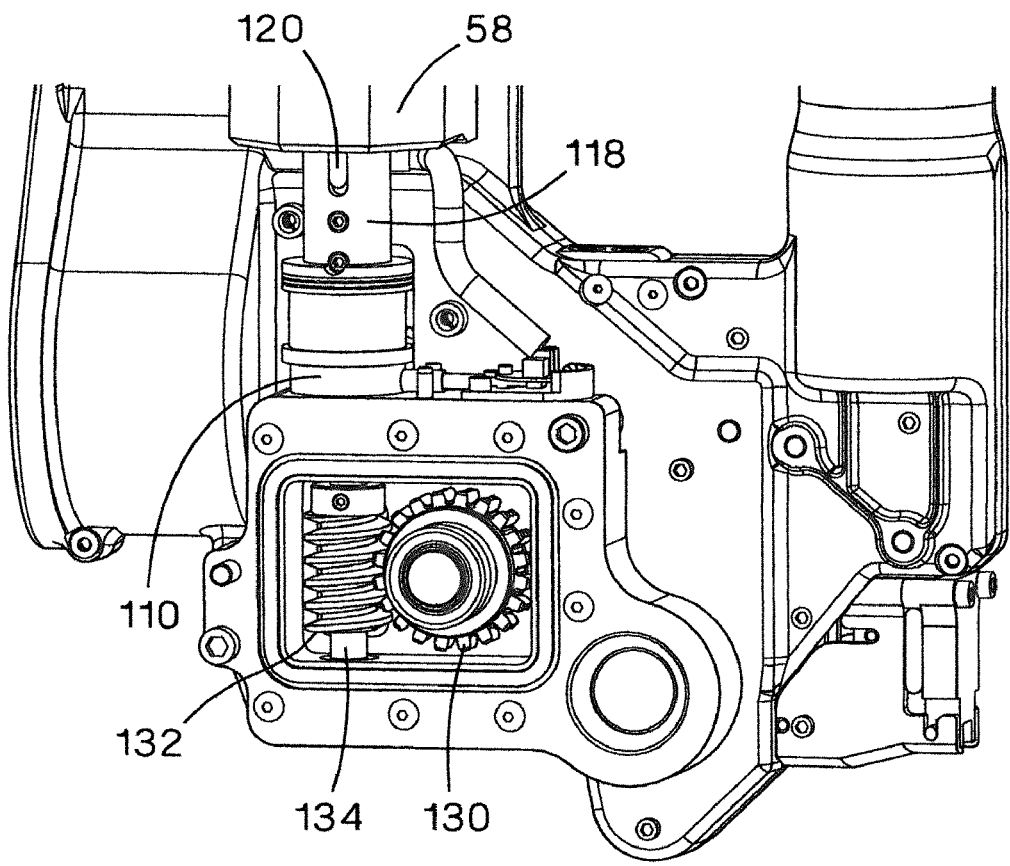
FIG. 10 is a partial perspective side view of the tension control system of the metal retained tension tie tool of FIG. 2 with the worm cushion removed.
Figure 12:
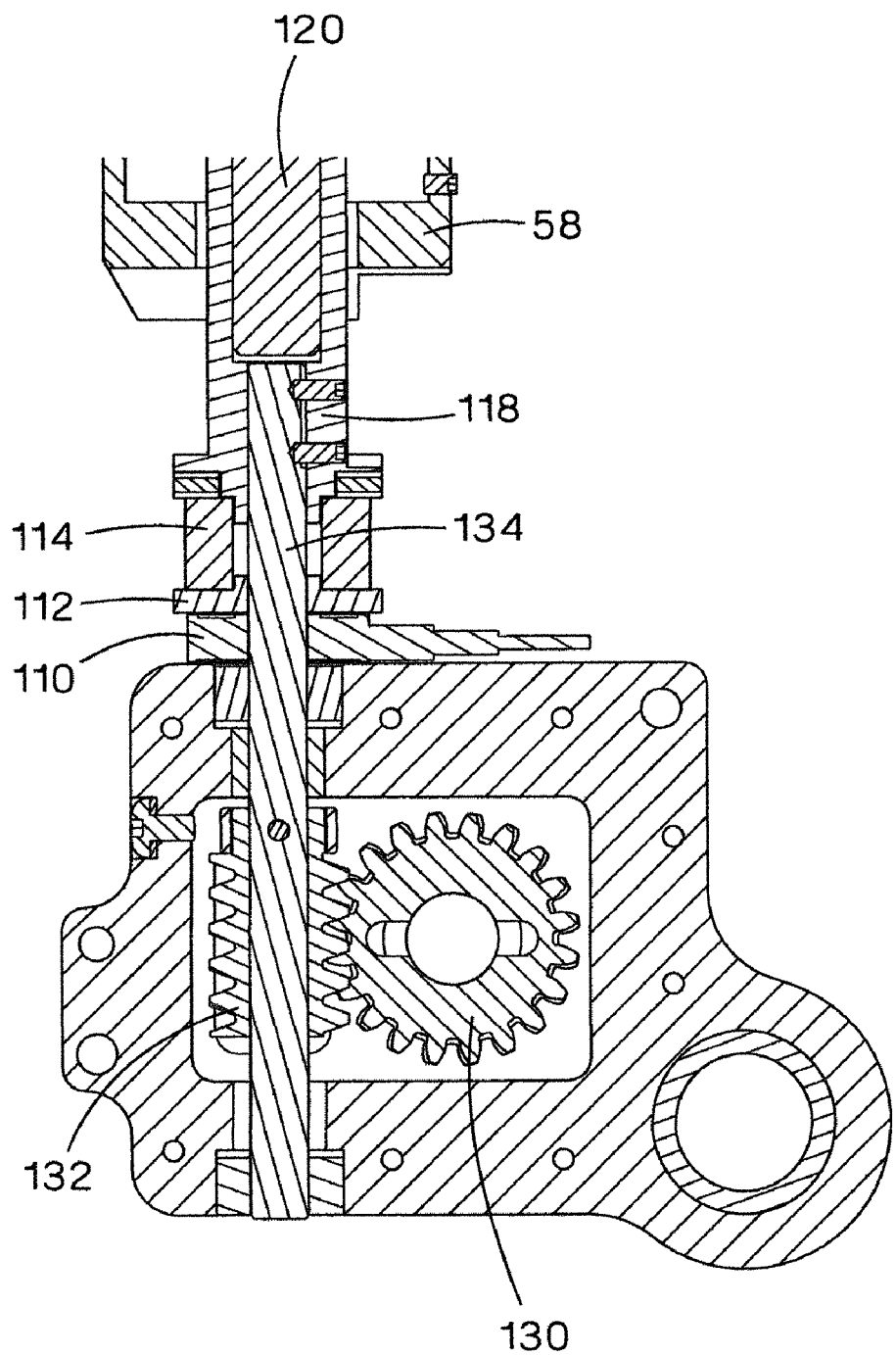
FIG. 12 is a cross sectional view of the tension control system of FIG. 10.

The gear train 76 includes the intermediate gears 78 illustrated in FIGS. 3-7 and the worm gear 130 and worm 132 illustrated in FIGS. 9, 10 and 12.

Figure 5:
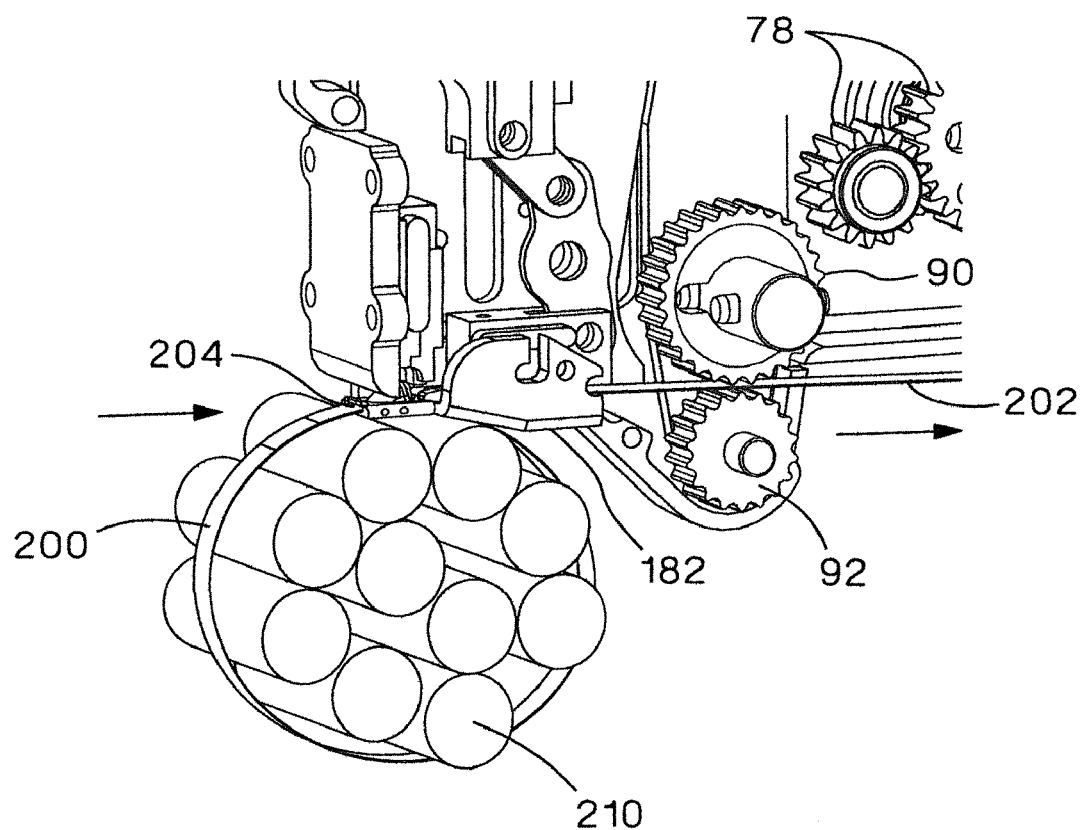
FIG. 5 is a partial perspective view of the metal retained tension tie tool of FIG. 4.
Figure 6:
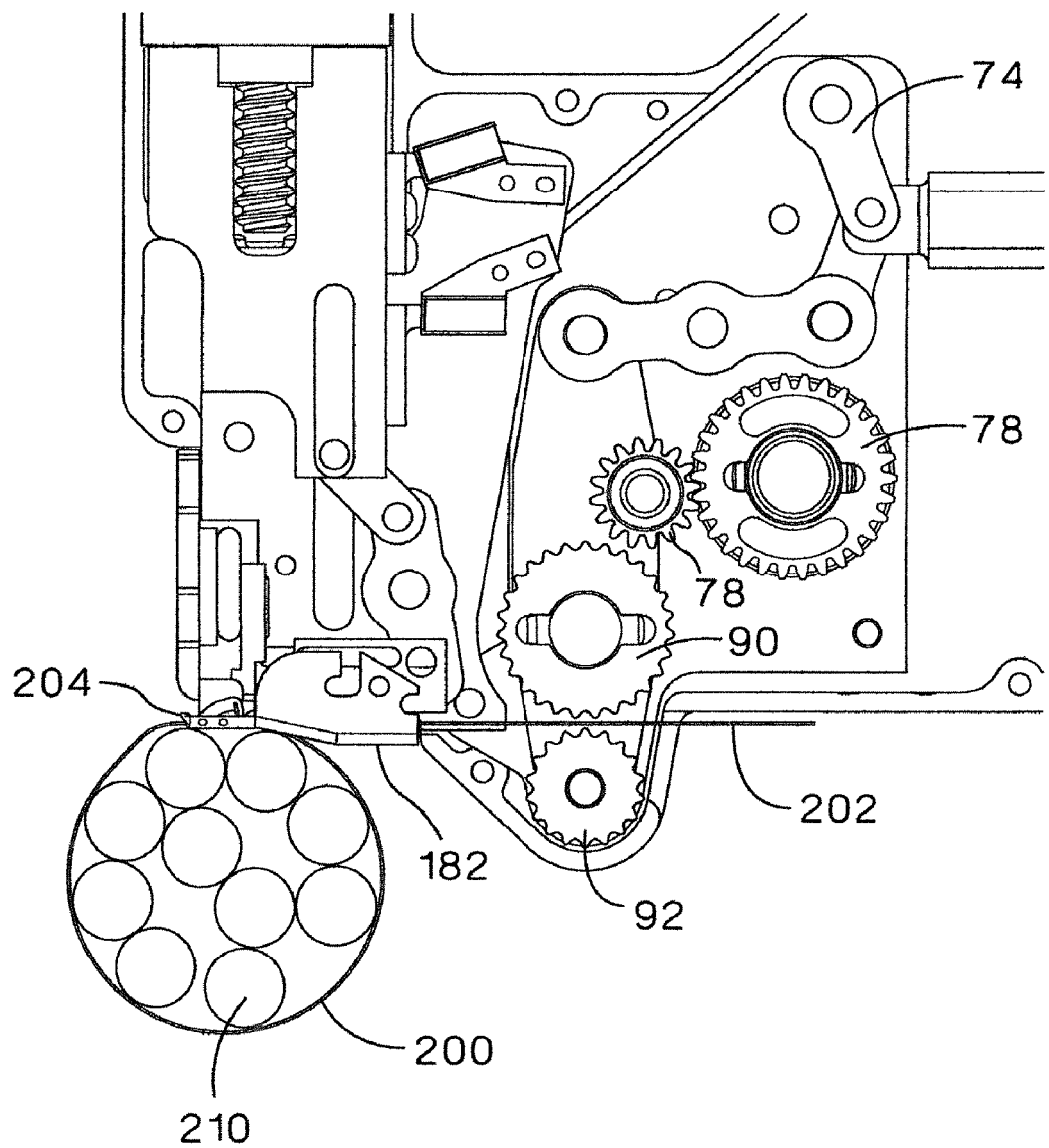
FIG. 6 is a side view of the metal retained tension tie tool of FIG. 5.
Figure 7:
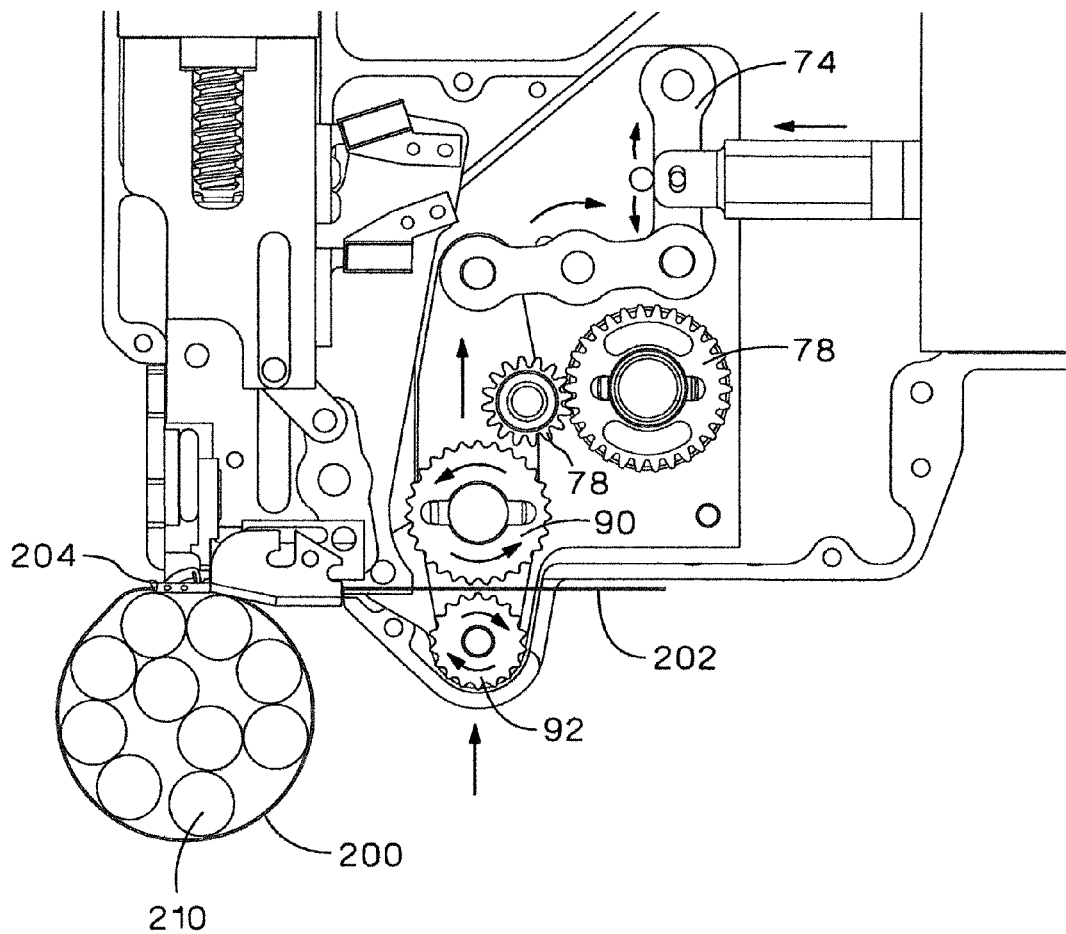
FIG. 7 is a side view of the metal retained tension tie tool of FIG. 5 with the rotary gears meshed.

FIGS. 5-7 illustrate the rotary gripper gears 70 tensioning the metal tie 200. An operator manually places the metal tie 200 around a bundle 210 and then slides the tie tail 202 into the anvil 182 through the open gripper gears 90, 92. Once the trigger 52 is pressed to start the tool, the tension motor 58 is activated. The trigger 52 also drives the intermediate gears 78, which drive the large gripper gear 90. The tension motor 58 also activates the pancake cylinder 72 enabling the cylinder 72 to extend, which toggles the gripper toggle links 74. As shown in FIG. 7, the gripper toggle links 74 move forward, forcing the idle gripper gear 92 to engage the large gripper gear 90. When the gripper gears 90, 92 are meshed and rotating, they create the pulling force on the tie tail 202 that causes the tie 200 to tension around the bundle 210. The large gripper gear 90 and the idle gripper gear 92 include a sine wave profile. As a result, the tie tail 202 becomes deformed as it passes through the meshed gripper gears 90, 92.

An electric tension control system 100 controls the tension of the tie 200 around the bundle 210 and signals the system to halt tensioning once the desired tension has been achieved. As described below, once the desired tension has been reached, the tension motor 58 is de-energized.

Figure 8:
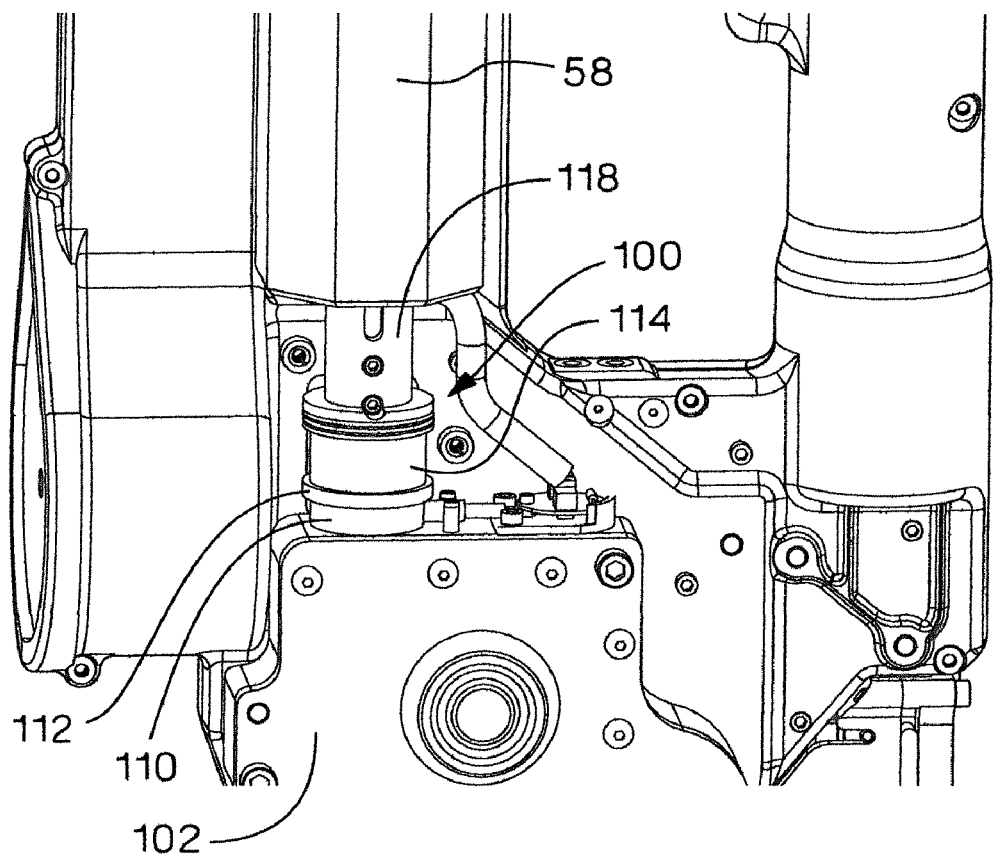
FIG. 8 is a partial side view of the metal retained tension tie tool of FIG. 2 with the cover removed.

FIGS. 8-12 illustrate the electric tension control system 100 of the present invention. FIG. 8 illustrates a side view of the tool with the load cell cover 104 (see FIG. 2) removed. The tension control system 100 includes a donut load cell 110, a load cell plate 112, a worm cushion 114 and a tension motor union 118. The donut load cell 110 measures the tension applied to the tie tail 202. The tension control system 100 also includes a gear train 76 that distributes the force from the tie tail 202 to the load cell 110. As the meshed gripper gears pull on the tie tail 202, the force on each gear tooth is translated to the intermediate gears 78 and the shaft the gears rotate about. The force reaches the gear box 102 and the worm gear 130 and worm 132 contained inside (see FIG. 9). The load cell 110 maintains the position of the worm 132 and the worm shaft 134.

Figure 11:
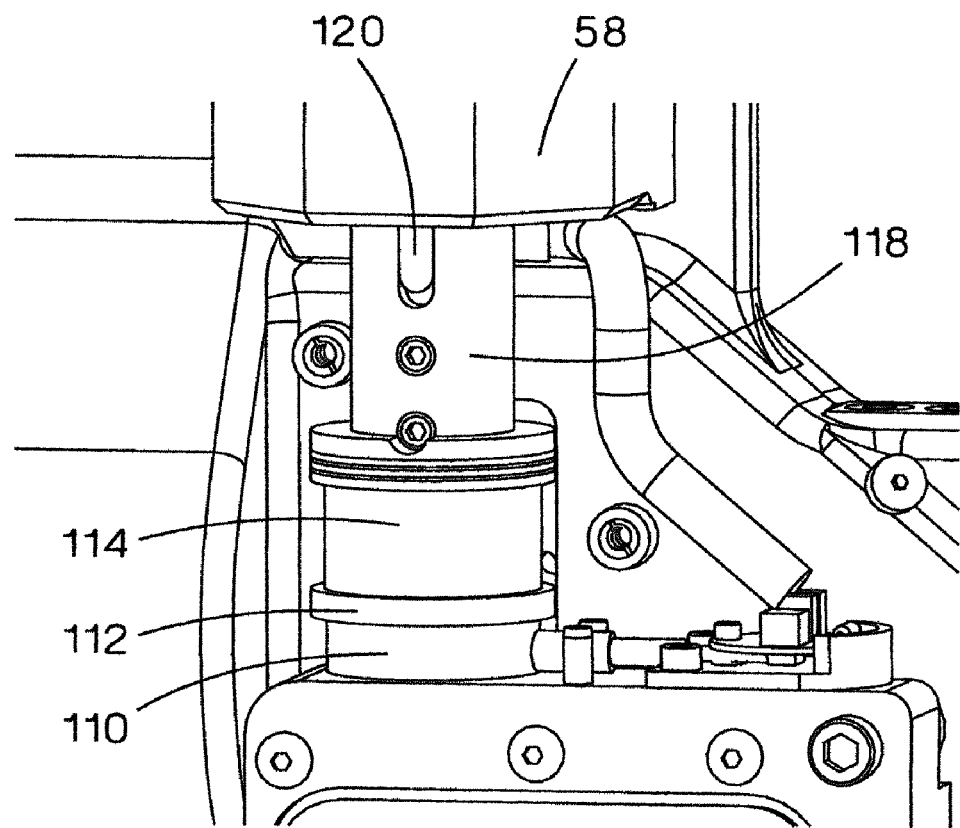
FIG. 11 is a partial perspective side view of the tension control system of FIG. 10.

As illustrated in FIGS. 10-12 the fixed tension motor 58 drives the worm shaft 134 by the tension motor union 118. The worm shaft 134 is free to move normal to its axis as the tension motor union 118 acts like a spline with the output shaft 120 of the tension motor 58. The output shaft 120 slides axially with respect to the tension motor 58. The load cell 110 restrains the normal movement of the worm shaft 134. As a result, the force applied on the worm shaft 134 from the worm 132 and the worm gear 130 is directed to the load cell 110.

As the load on the worm 132 and worm gear 130 increases, the resultant force is distributed through a worm cushion 114 to a load cell plate 112 into the load cell 110. The worm cushion 114 is formed from a compliant member, such as urethane, or any material with rubber characteristics. As the worm shaft 134 turns, the resultant force at the worm 132 and worm gear 130 creates a downward force on the worm shaft 134. Since the tension motor union 118 is fixed to the worm shaft 134, as the worm shaft 134 moves downward so does the tension motor union 118. As the tension motor union 118 moves downward, the force compresses the worm cushion 114, which translates the force to the load cell plate 112 and then into the load cell 110.

The worm cushion 114 decreases the halt rate of the gear train 76 to reduce gear shock. The worm cushion 114 dampens the tension as the tension motor 58 is de-energized thereby reducing the stress or impact on the tool. The worm cushion 114 also acts as a spring by returning the worm 132 to its home position after the desired tension has been reached.

An electric controller monitors the output of the load cell 110. Once the desired tie tension has been achieved, the tension motor 58 is de-energized. The worm cushion 114 of the present invention enables the tension control system 100 to measure an accurate applied tie tension thereby preventing the tool from over tensioning the tie.

The electric tension control system 100 also enables force on the tie tail to be output to a recording device, i.e. a computer, for data collection. The electrical tension control system 100 is an improvement over prior mechanical detent systems because typical mechanical detent systems have a tendency to wear over time and change the calibration of the tool.

After the desired tension has been reached and the tension motor 58 is de-energized, the controller energizes the set/shear motor 152. The meshed gears 90, 92 maintain the tie tail 202 in place while the ball set and shear mechanism 150 is activated. FIGS. 3, 4 and 13-16 illustrate the ball set and shear mechanism 150 of the present invention.

Figure 3:
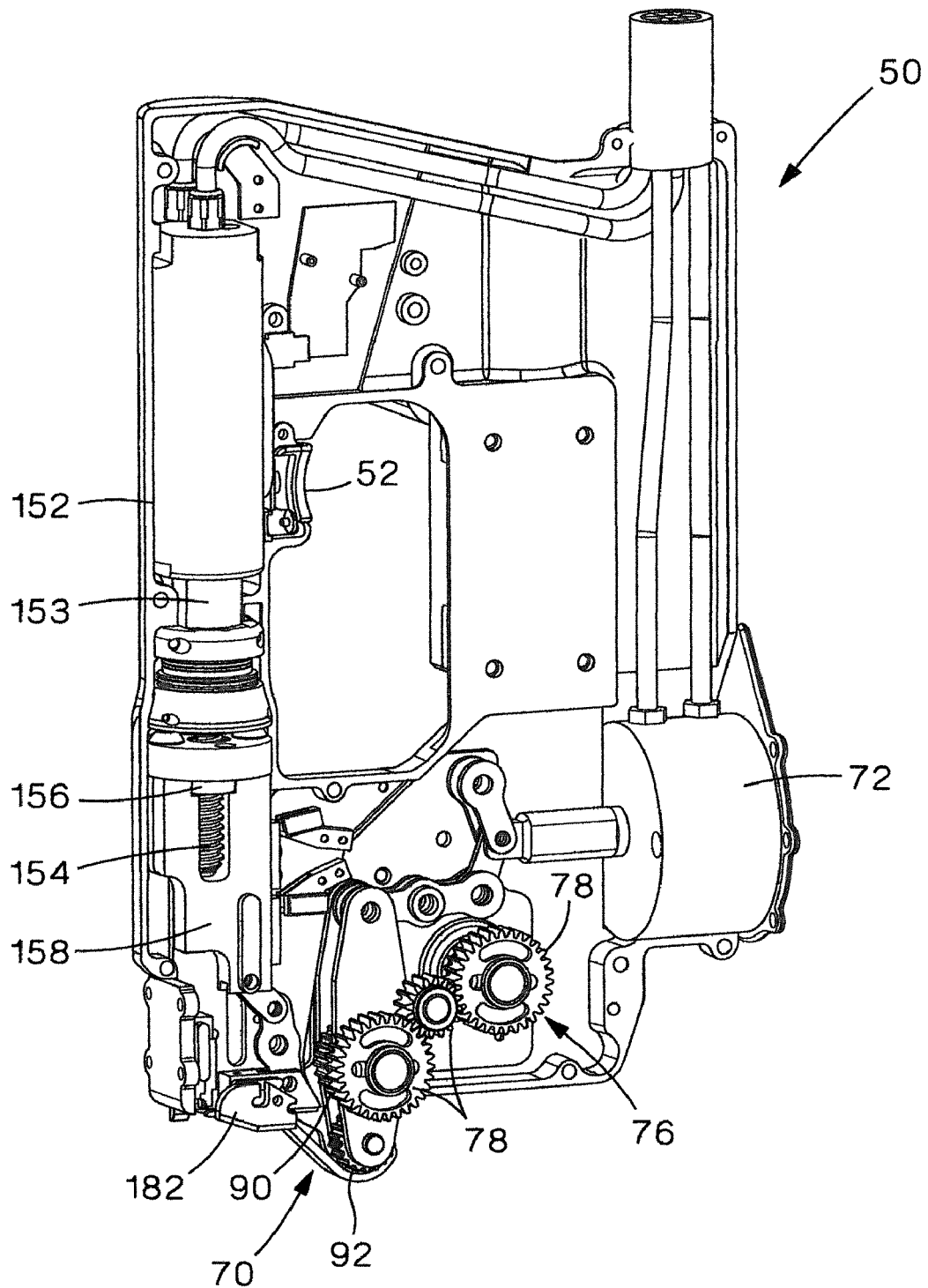
FIG. 3 is a right side perspective view of the metal retained tension tie tool of FIG. 1 with the cover removed.
Figure 4:
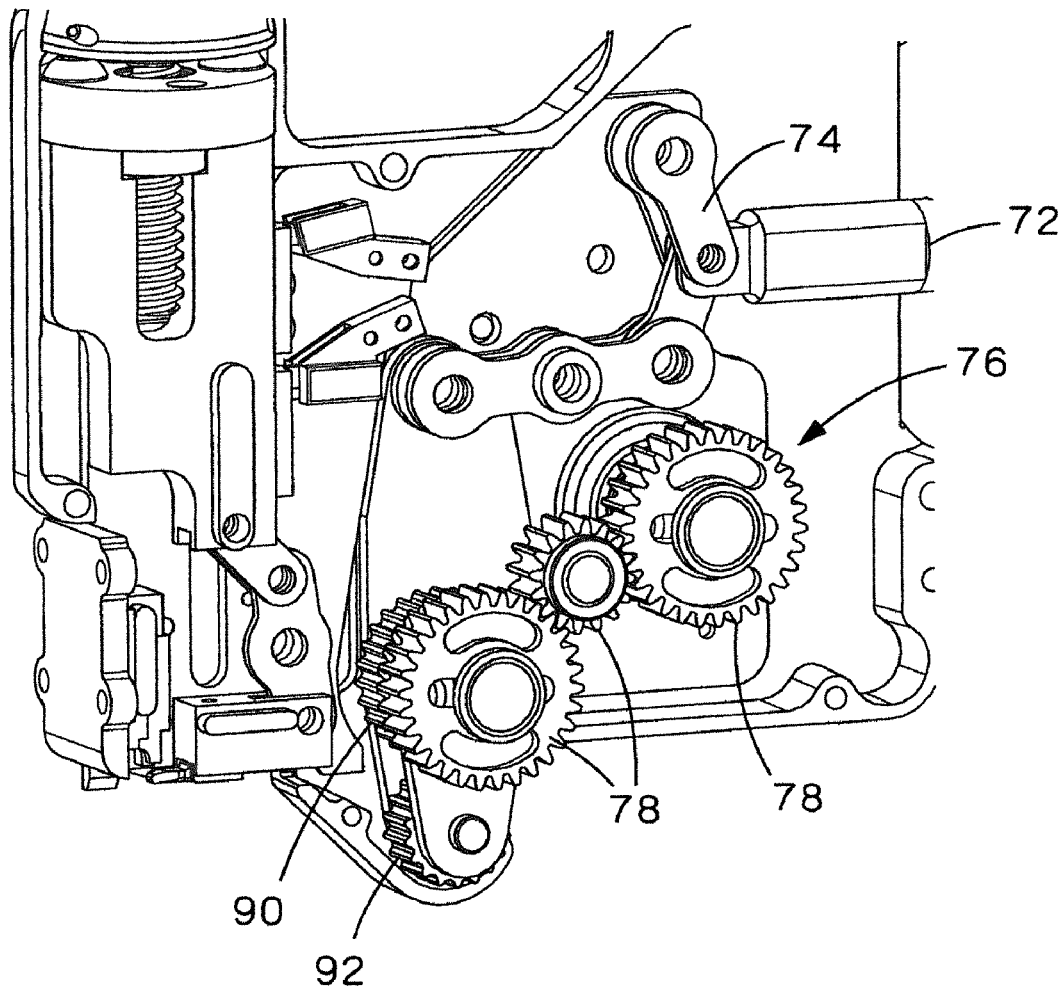
FIG. 4 is a partial perspective side view of the gripper gears of the metal retained tension tie tool of FIG. 1.
Figure 13:
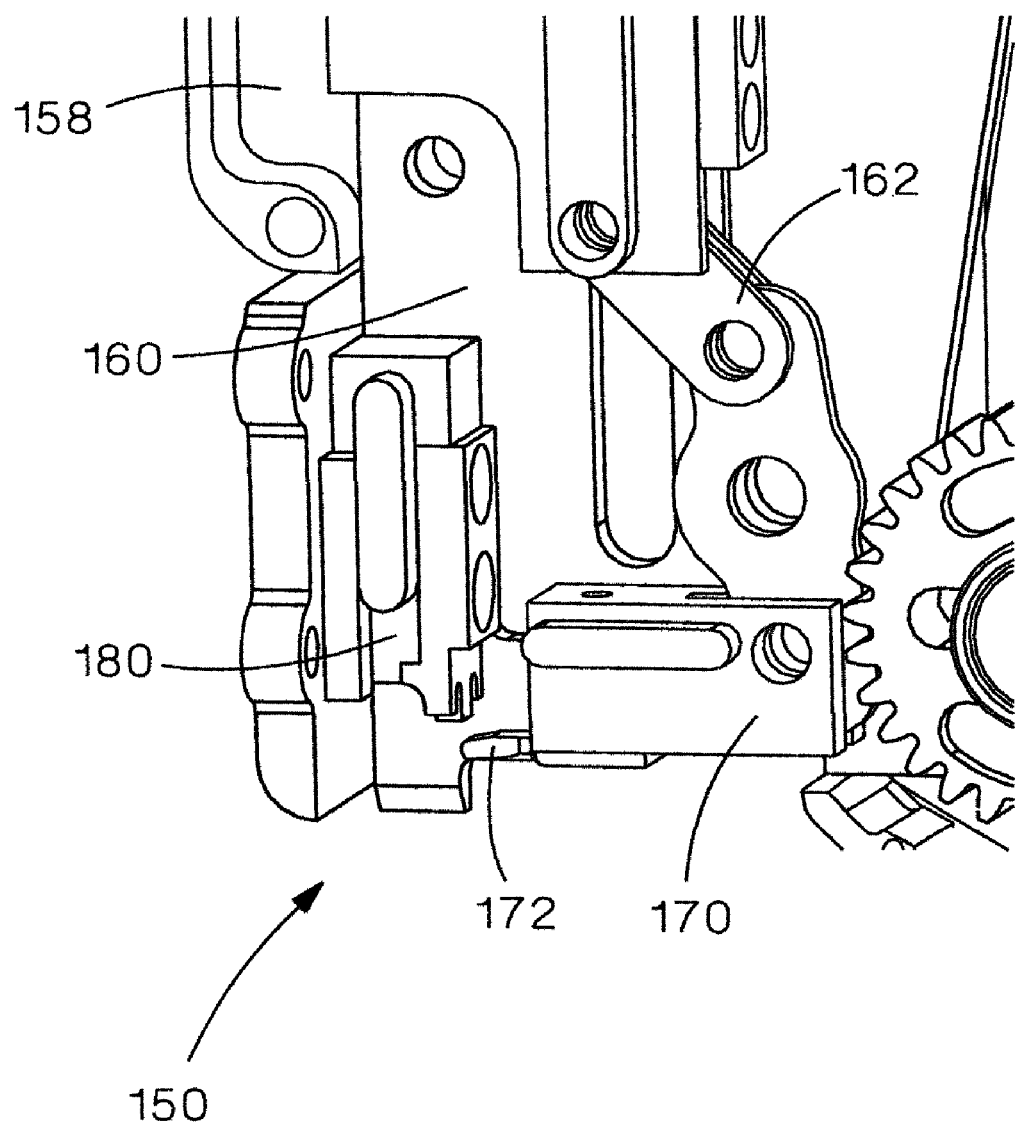
FIG. 13 is a partial side view of the ball set and shear mechanism of the metal retained tension tie tool of FIG. 1.
Figure 14:
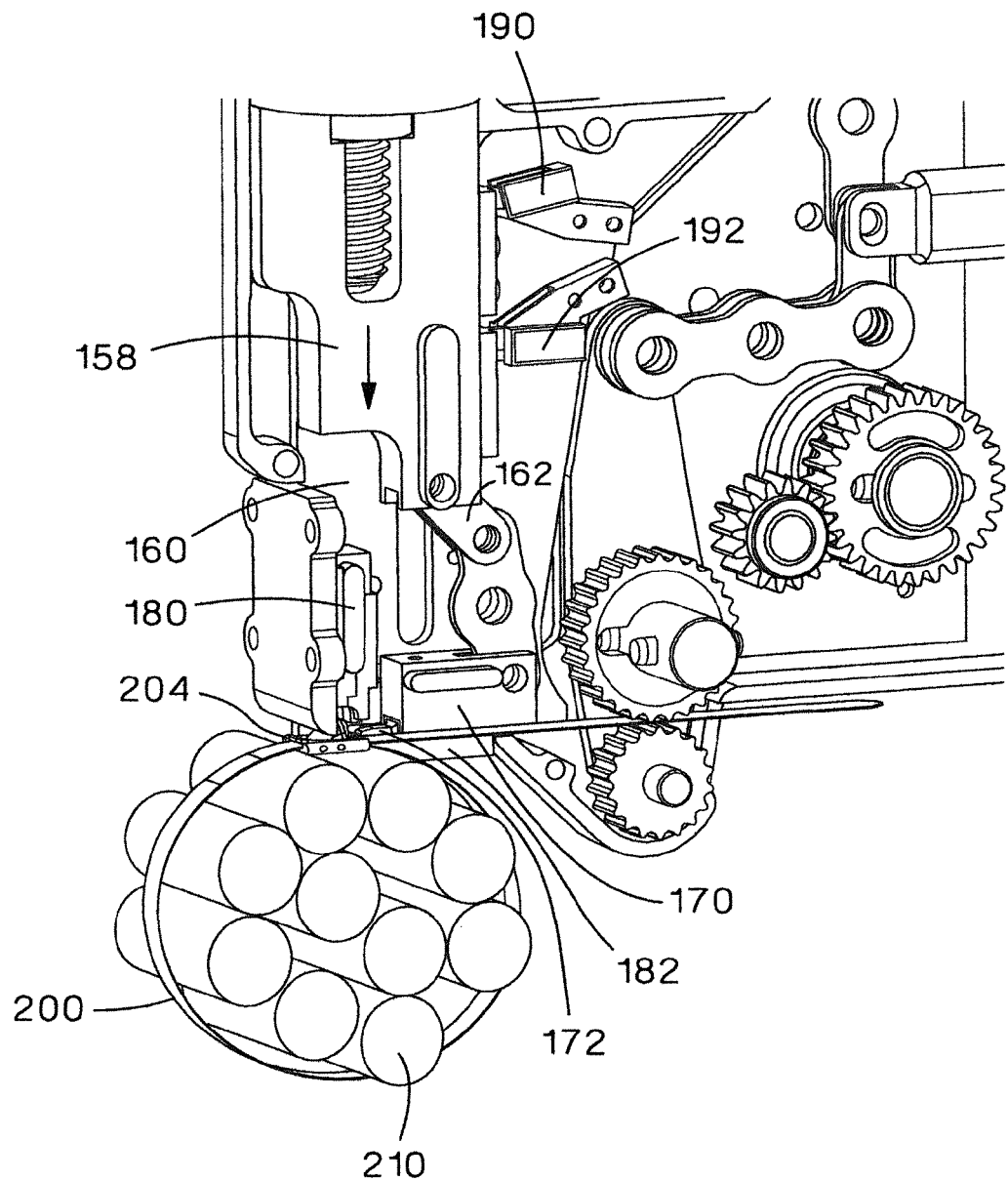
FIG. 14 is a side perspective view of the ball set and shear mechanism of the metal retained tension tie tool of FIG. 1.
Figure 15:
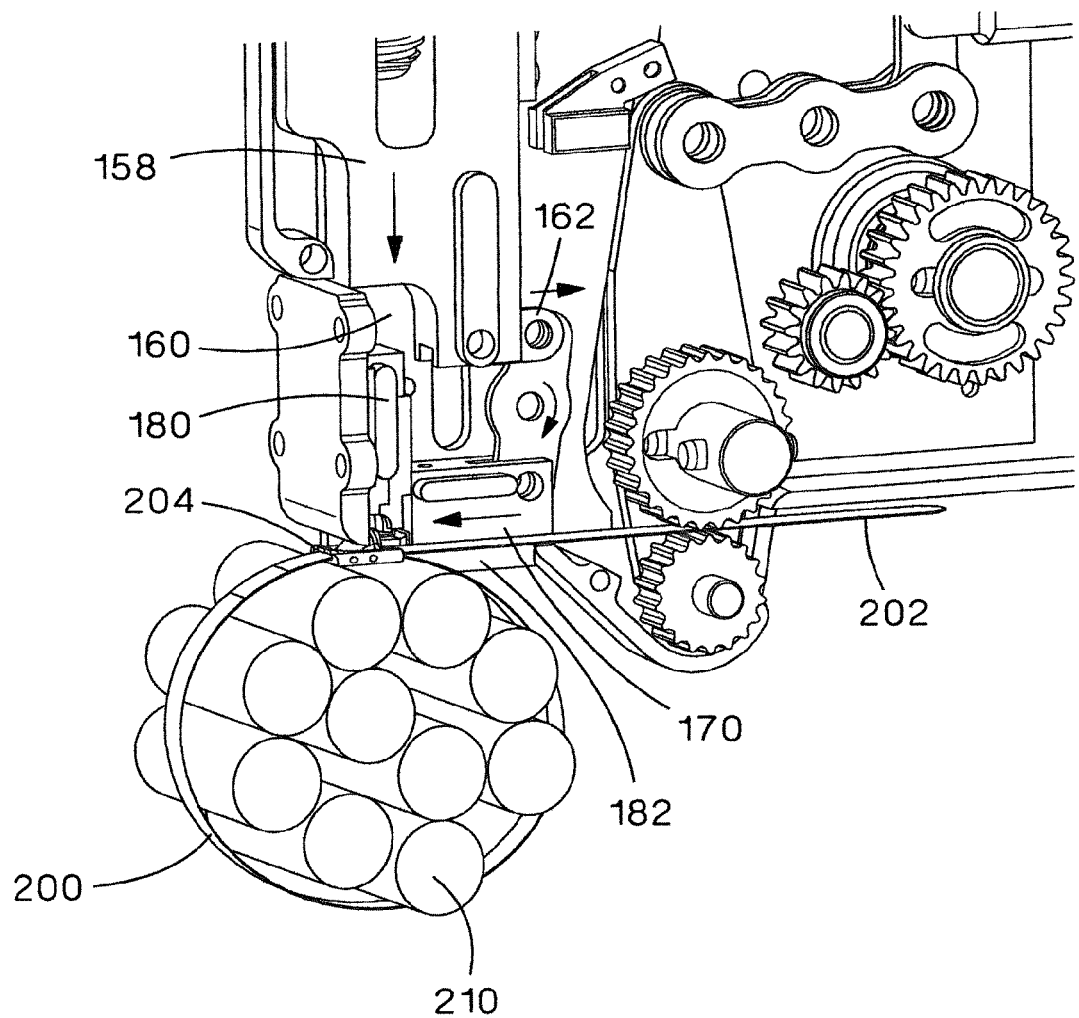
FIG. 15 is a side perspective view of the ball set and shear mechanism of the metal retained tension tie tool of FIG. 14 with the ball set in the tie head.

As shown in FIG. 3, the motor 152 for the ball set and shear mechanism 150 has a threaded rod 154 attached to the output shaft 153 (see FIG. 3) of the set/shear motor 152. A mating nut 156 runs up and down the threaded rod 154 based on the direction of the rotation of the output shaft 153 (see FIG. 3). The nut 156 is attached to a cutoff ram 158. The cutoff rain 158 moves toward the anvil 182 as a result of the rotation of the threaded rod 154. As illustrated in FIGS. 13 and 14, the cutoff ram 158 is keyed to the side plates 160 and is connected to the ball set block 170 by a toggle linkage 162. The toggle linkage 162 forces the ball set block 170 toward the tie head 204. As illustrated in FIG. 15, when the toggle linkage 162 passes over center, the ball set block 170 has traveled the appropriate distance into the tic head for the set block finger 172 to set the ball the desired depth. As the cutoff ram 158 continues toward the anvil 182, the toggle linkage 162 forces the ball set block 170 away from the tie head 204.

Figure 16:
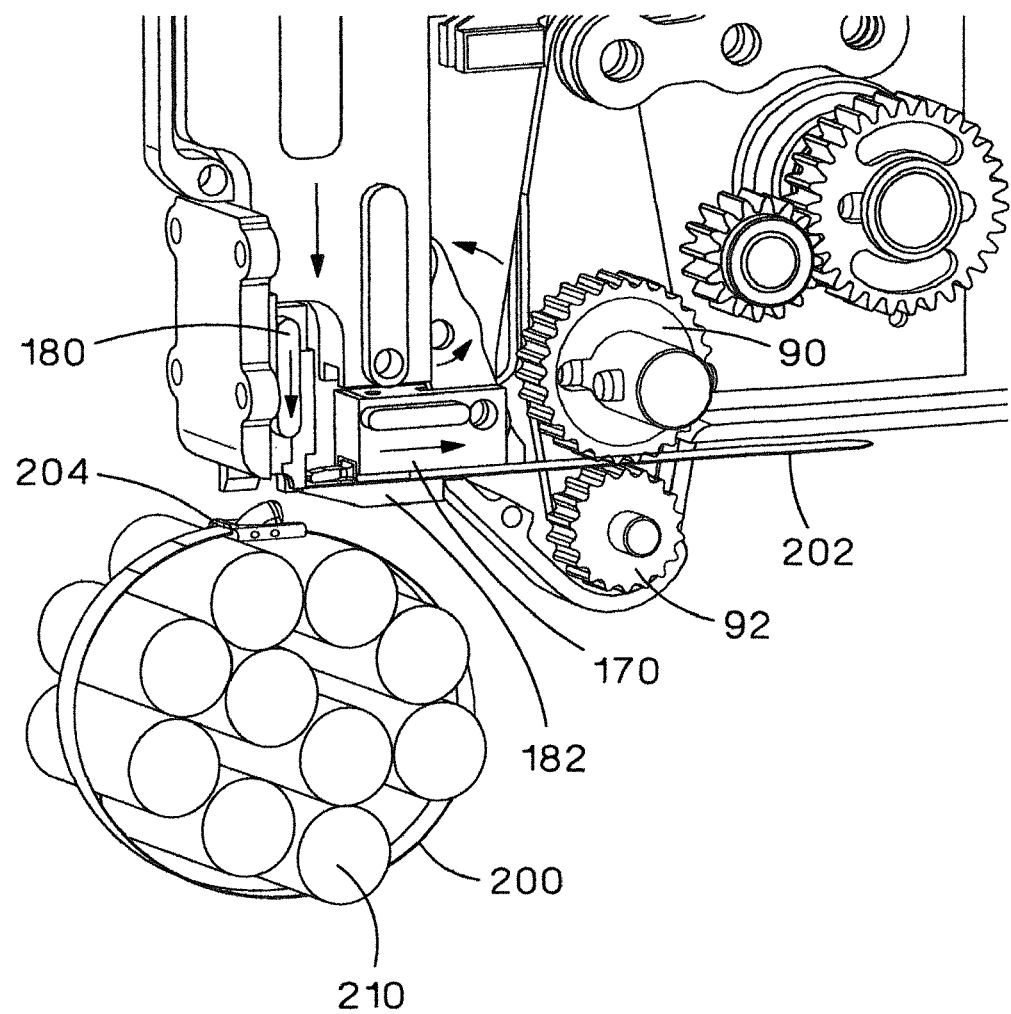
FIG. 16 is a side perspective view of the ball set and shear mechanism of the metal retained tension tie tool of FIG. 14 with the tie tail sheared.

The cutoff ram 158 then contacts the shear block 180 and pushes the shear block 180 toward the anvil 182. As illustrated in FIG. 16, the shear block 180 contacts the tie head 204 and pushes the tie head 204 down past the anvil 182. Since the tie tail 202 is held above the anvil 182, the force of the tie head 204 being pushed past the anvil 182 shears the tie tail 202 from the bundle 210 creating a flush cutoff at the tie head 204. The remaining portion of the tie tail 202 is ejected from the tool by the gripper gears 90, 92.

Two electric optical sensors 190, 192 monitor the movement of the cutoff rain 158. Once the cutoff ram 158 moves from the home optical sensor 190, the electric controller begins to monitor the sensors 190, 192. When the away optical sensor 192 detects the cutoff ram 158, the controller reverses the set/shear motor 152 and returns the cutoff ram 158 to the home sensor location. The spring loaded shear block 180 travels upwards in the tool with the cutoff ram 158 and the toggle linkage 162 reverses the ball set block 170 returning it to the starting position. Once the home optical sensor 190 detects the returned cutoff ram 158, the set/shear motor 152 is de-energized and the tension motor 58 is energized preparing the tool to tension another metal tie.

Furthermore, while the particular preferred embodiments of the present invention have been shown and described, it will be obvious to those skilled in the art that changes and modifications may be made without departing from the teaching of the invention. The matter set forth in the foregoing description and accompanying drawings is offered by way of illustration only and not as limitation. The actual scope of the invention is intended to be defined in the following claims when viewed in their proper perspective based on the prior art.

The invention claimed is:

1. A tool for installing a metal tie, the tool comprising:
a tension mechanism for tensioning the metal tie wrapped around a bundle;
a tension control system for measuring the applied tension, wherein the tension control system includes a load cell; and
wherein the tension control system further includes a gear train with a worm gear, a worm shaft and a worm positioned around the worm shaft, the load cell being positioned around the worm shaft, wherein rotational movement of the worm and the worm shaft linearly distributes applied tension to the load cell.

2. The tool of claim 1, wherein the tension control system includes a worm cushion for dampening the tension applied to the load cell.

3. The tool of claim 1, wherein the tensioning mechanism includes rotary gripper gears for tensioning the metal tie.

4. The tool of claim 3, wherein the rotary gripper gears deform the tensioned tie.

5. The tool of claim 1, further comprising a ball set and cut-off mechanism for setting a ball in a metal tie head of the metal tie and for shearing a portion of the tensioned metal tie.

6. The tool of claim 5, wherein the ball set and cut-off mechanism includes a set block for setting the ball in the metal tie head and a shear block for shearing a tie tail from the metal tie head.

7. The tool of claim 6, wherein the set block includes a finger for engaging the ball in the metal tie head.

8. The tool of claim 6, furthering comprising a ram for engaging the shear block.

9. The tool of claim 1, wherein once the load cell measures a desired applied tension, the tension mechanism is de-energized.

* * * * *